United States Patent
Ohira et al.

(10) Patent No.: US 8,040,576 B2
(45) Date of Patent: Oct. 18, 2011

(54) IMAGE READING APPARATUS

(75) Inventors: Hideo Ohira, Tajimi (JP); Yoshinori Osakabe, Seto (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 997 days.

(21) Appl. No.: 11/940,314

(22) Filed: Nov. 14, 2007

(65) Prior Publication Data

US 2009/0268260 A1    Oct. 29, 2009

(30) Foreign Application Priority Data

Nov. 14, 2006    (JP) ................................. 2006-307393

(51) Int. Cl.
    H04N 1/04    (2006.01)
(52) U.S. Cl. ........ 358/474; 358/501; 358/488; 358/497; 399/364; 399/367
(58) Field of Classification Search .................. 358/474, 358/501, 486, 488, 496, 497; 399/16, 364, 399/367, 371, 374
    See application file for complete search history.

(56) References Cited

U.S. PATENT DOCUMENTS

| | | | | |
|---|---|---|---|---|
| 5,513,017 | A * | 4/1996 | Knodt et al. | 358/471 |
| 6,661,538 | B1 * | 12/2003 | Takeuchi | 358/474 |
| 7,420,717 | B2 * | 9/2008 | Park | 358/474 |
| 7,420,718 | B2 * | 9/2008 | Shimizu | 358/498 |
| 7,423,786 | B2 * | 9/2008 | Khovaylo | 358/474 |
| 7,752,968 | B2 * | 7/2010 | Fuchs | 101/485 |
| 2003/0095294 | A1 * | 5/2003 | Shih et al. | 358/497 |
| 2003/0184771 | A1 * | 10/2003 | Yamamoto et al. | 358/1.7 |
| 2003/0202222 | A1 * | 10/2003 | Amimoto et al. | 358/474 |
| 2004/0017593 | A1 * | 1/2004 | Khovaylo | 358/474 |
| 2005/0190413 | A1 * | 9/2005 | Khovaylo | 358/474 |
| 2005/0199778 | A1 * | 9/2005 | Kadowaki et al. | 250/201.5 |
| 2007/0058219 | A1 * | 3/2007 | Yamaguchi | 358/497 |
| 2007/0177234 | A1 * | 8/2007 | Morisaki | 358/509 |
| 2007/0248367 | A1 * | 10/2007 | Fuchs | 399/16 |

FOREIGN PATENT DOCUMENTS

JP    S53-104638 U    8/1978

(Continued)

OTHER PUBLICATIONS

Japan Patent Office, Notification of Reasons for Refusal for Japanese Patent Application No. 2006-307393 (counterpart to above-captioned patent application), dispatched Aug. 3, 2011.

Primary Examiner — Negussie Worku
(74) Attorney, Agent, or Firm — Baker Botts L.L.P.

(57) ABSTRACT

An image reading apparatus includes an original-sheet support table and reading an image on an original sheet supported by the original-sheet support table. The original-sheet support table includes: (a) an original-sheet support surface on which the original sheet is supported; (b) a contact surface which stands up from the original-sheet support surface and is contactable with one side of the original sheet supported by the original-sheet support surface; and (c) at least one guide mark which is provided in the contact surface. The original sheet is positioned on the original-sheet support surface in a state in which the one side of the original sheet is held in contact with the contact surface of the original-sheet support table and one end of the one side of the original sheet is aligned with the at least one guide mark.

15 Claims, 10 Drawing Sheets

FOREIGN PATENT DOCUMENTS

| | | |
|---|---|---|
| JP | S60-074150 U | 5/1985 |
| JP | S60-078037 U | 5/1985 |
| JP | S60-142249 U | 9/1985 |
| JP | S61-087145 A | 5/1986 |
| JP | 5167784 A | 7/1993 |
| JP | 584957 U | 11/1993 |
| JP | 9152667 A | 6/1997 |
| JP | 11088595 A | 3/1999 |
| JP | 11355486 A | 12/1999 |
| JP | 2001142157 A | 5/2001 |
| JP | 2005338683 A | 12/2005 |

* cited by examiner

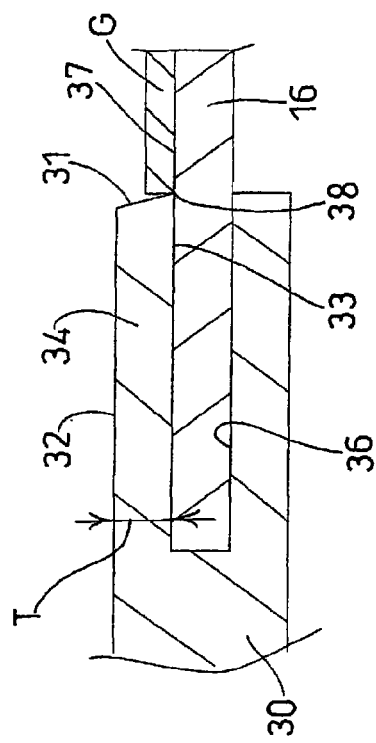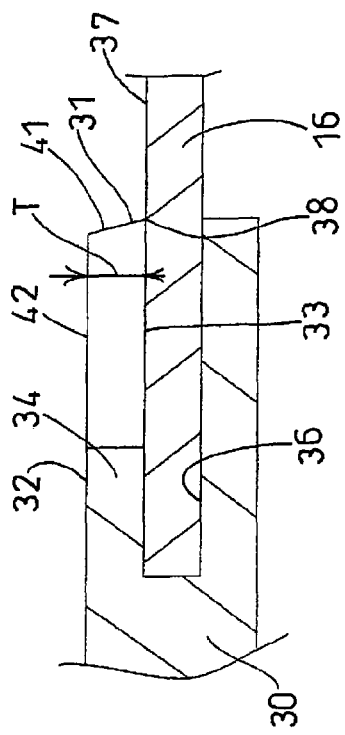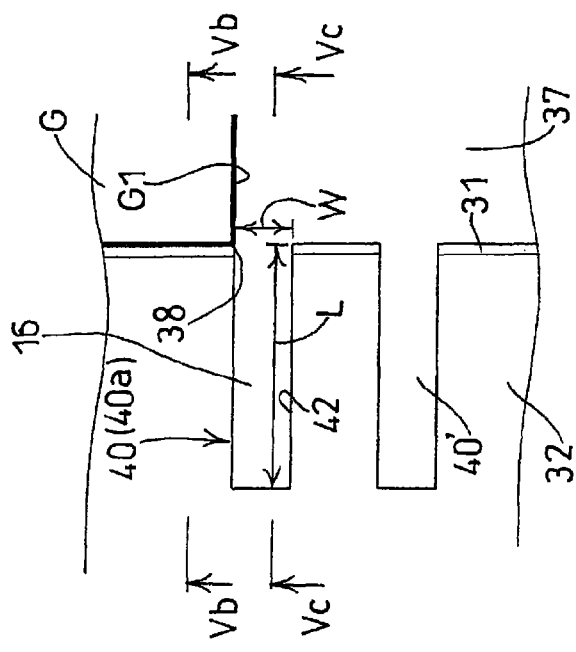

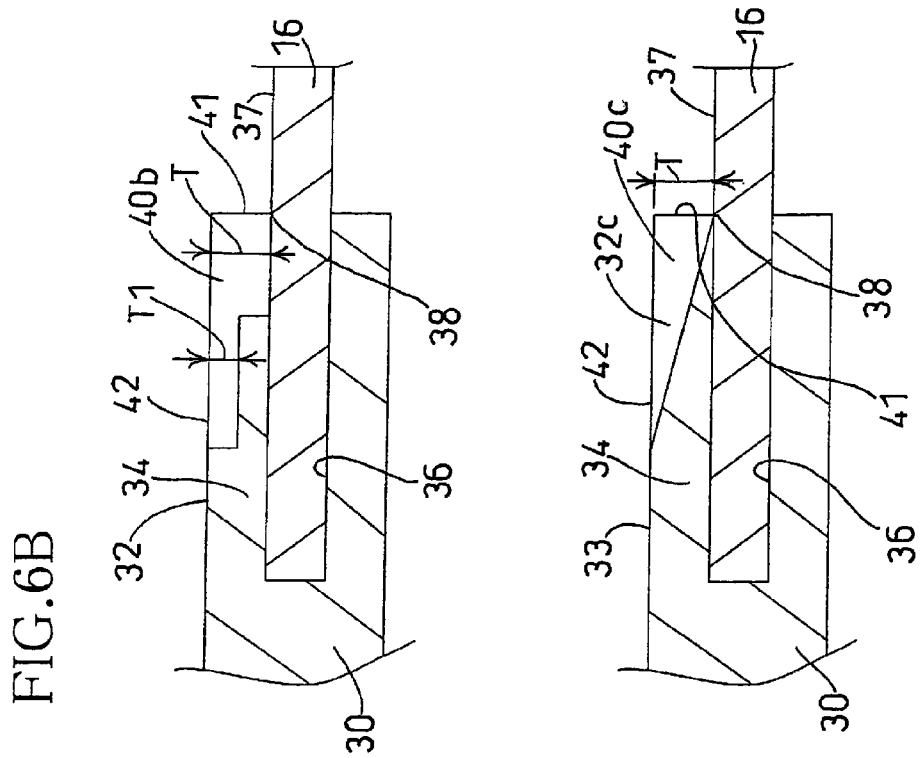
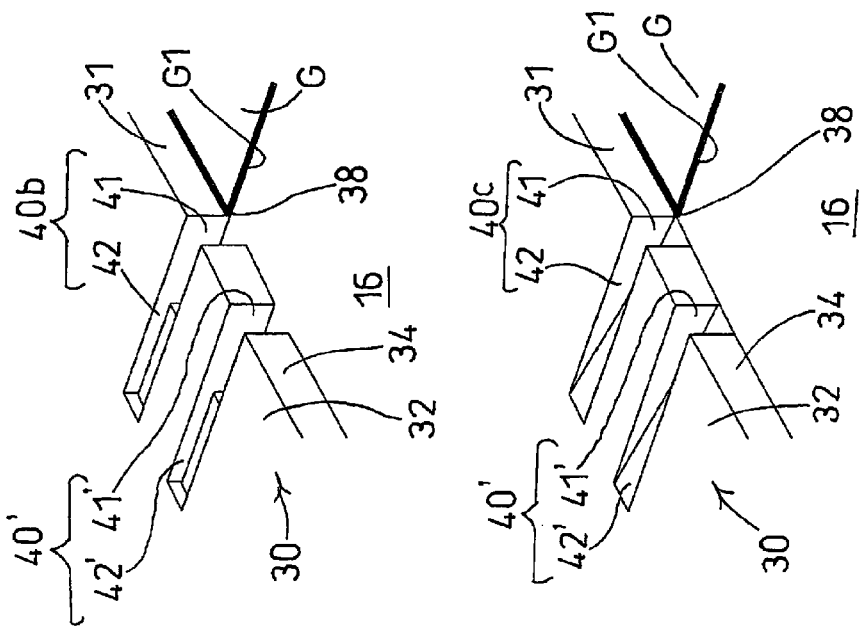
FIG.6A  FIG.6B  FIG.6C  FIG.6D

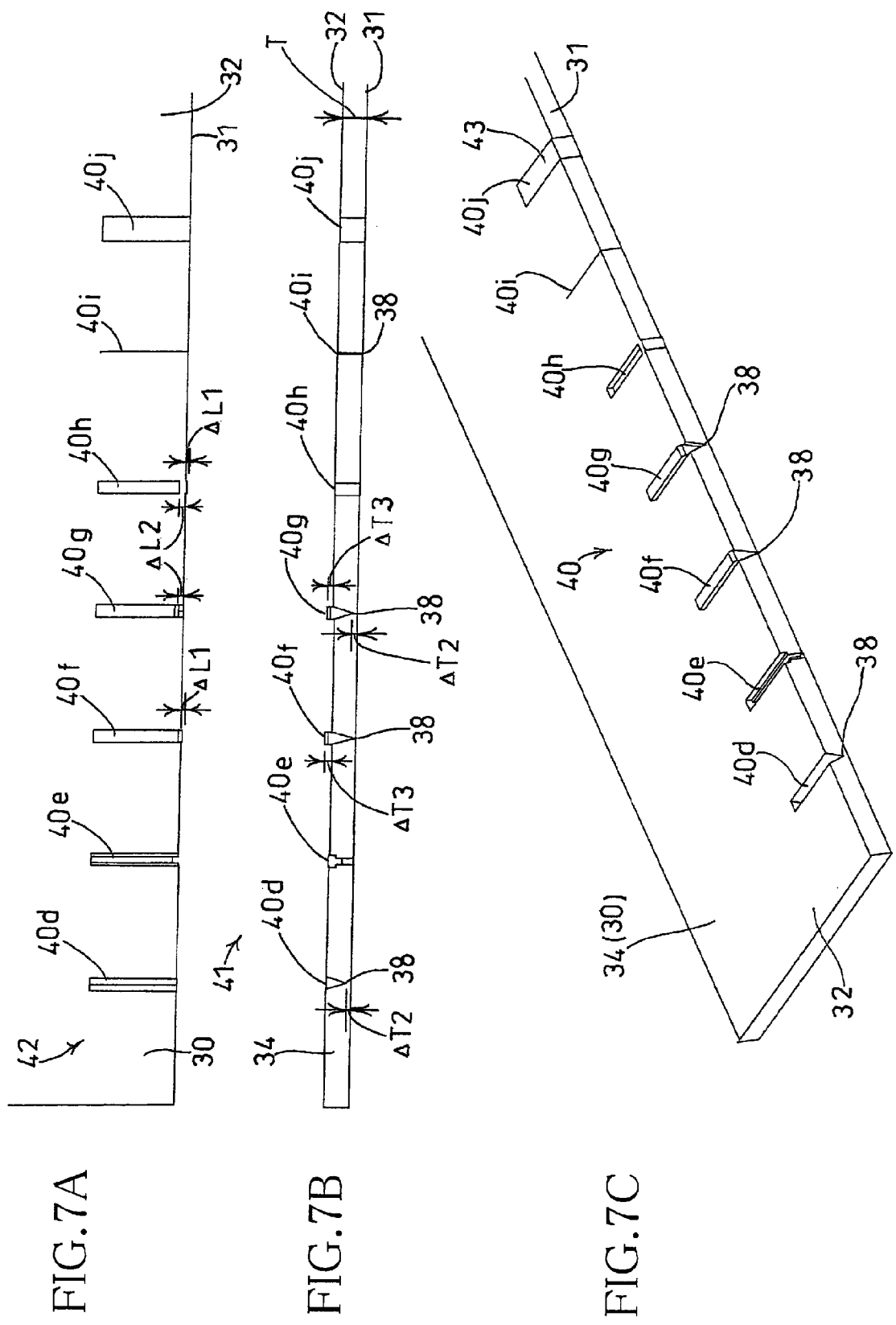

FIG.8A
FIG.8B
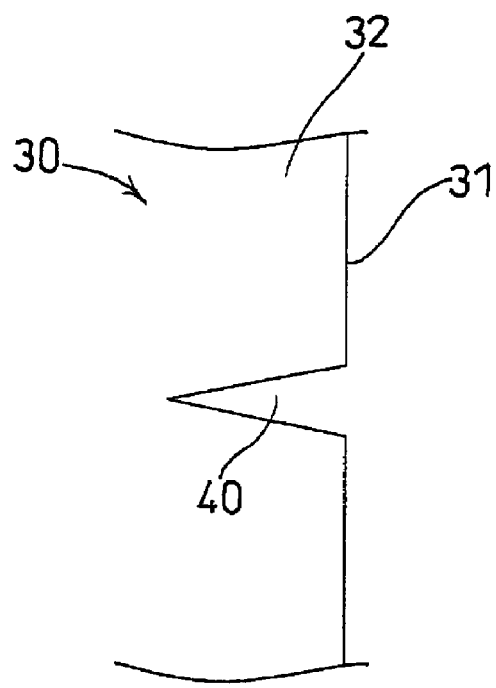
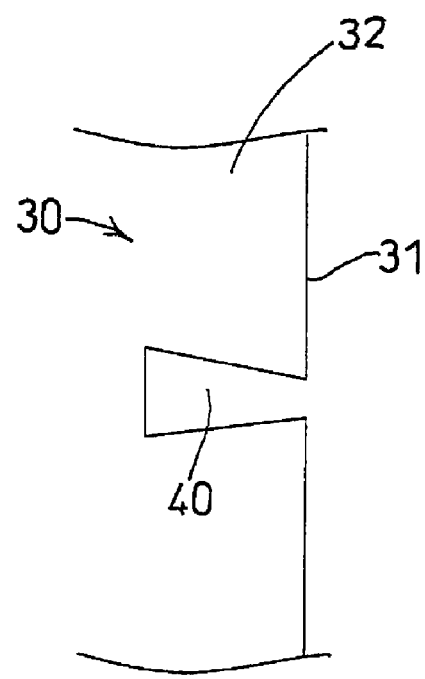

IMAGE READING APPARATUS

CROSS REFERENCE TO RELATED APPLICATION

The present application claims priority from Japanese Patent Application No. 2006-307393, which was filed on Nov. 14, 2006, the disclosure of which is herein incorporated by reference in its entirety.

BACKGROUND OF THE INVENTION

1. Field of the Invention

The present invention relates to an image reading apparatus of so-called "flat-bed" type that reads an original sheet supported by an original-sheet support table.

2. Discussion of Related Art

There is known an image reading apparatus of flat-bed type that reads an original sheet when the original sheet is placed on a glass plate fixed to an original-sheet support table such that a recorded surface of the original sheet faces downward and an image scanner which is located below the glass plate scans the recorded surface of the original sheet. In the image reading apparatus, the original sheet is needed to be positioned at an appropriate position relative to the glass plate (the image scanner) so that the image reading apparatus recognizes correctly a size of the original sheet and reads the original sheet by the image scanner. Therefore, JP-A-2001-142157 discloses an image reading apparatus including a guide member provided on a periphery of the glass plate to guide or assist a user in positioning of the original sheet on the glass plate.

The guide member includes (1) a contact surface which is contactable with one side (a side surface perpendicular to the recorded surface) of the original sheet when the original sheet is positioned on an original-sheet support surface of the glass plate and (2) a guide mark which is formed on a surface (an upper surface) of the guide member adjacent to the contact surface thereof for indicating a position of another side of the original sheet perpendicular to the one side thereof.

However, as shown in FIG. 10A, in order that the contact surface 131 is contactable with the original sheet G, the guide member 130 stands up from the original-sheet support surface 137 of the glass plate. Thus, the guide mark 140 which is formed on the upper surface of the guide member 130 is located at a height position higher than the original-sheet support surface 137.

When a user places the original sheet G on the glass plate, the user usually looks at the glass plate in an inclined direction relative to the original-sheet support surface 137 of the glass plate and the user rarely looks from right above the glass plate. Therefore, as shown in FIG. 10B, though the another side G1 of the original sheet G should be positioned at a position on the original-sheet support surface 137 illustrated in a one-dot chain line, the another side G1 is positioned at an offset position illustrated in a solid line because of the difference in height positions between the guide mark 140 and the original sheet G (or the original-sheet support surface 137), leading to a lowered accuracy of positioning of the original sheet G relative to the original-sheet support surface 137 of the glass plate.

SUMMARY OF THE INVENTION

It is therefore an object of the present invention to provide an image reading apparatus including an original-sheet support table in which the original sheet can be positioned at an appropriate position with high accuracy.

According to the present invention, there is provided an image reading apparatus, comprising an original-sheet support table and reading an image on an original sheet supported by the original-sheet support table, wherein the original-sheet support table includes: (a) an original-sheet support surface on which the original sheet is supported; (b) a contact surface which stands up from the original-sheet support surface and is contactable with one side of the original sheet supported by the original-sheet support surface; and (c) at least one guide mark which is provided in the contact surface, and wherein the original sheet is positioned on the original-sheet support surface in a state in which the one side of the original sheet is held in contact with the contact surface of the original-sheet support table and one end of the one side of the original sheet is aligned with the at least one guide mark.

In the present image reading apparatus, the original-sheet support table includes the contact surface which stands up from the original-sheet support surface and is contactable with the one side of the original sheet so as to position the original sheet on the original-sheet support surface. Therefore, in a case in which a guide mark is provided only in an upper surface of the original-sheet support table perpendicular to the contact surface thereof, the above-described problem experienced in the related art occurs. However, in the present image reading apparatus, since the at least one guide mark is provided in the contact surface, the user can position the original sheet in the original-sheet support table with high accuracy in a state in which the one side of the original sheet is held in contact with the contact surface of the original-sheet support table and the one end of the one side of the original sheet is aligned with the at least one guide mark. In the present image reading apparatus, even when the user looks at the glass plate from an inclined angle in placing the original sheet on the glass plate, the accuracy of positioning the original sheet on the original-sheet support surface is not lowered.

BRIEF DESCRIPTION OF THE DRAWINGS

The above and optional objects, features, and advantages of the present invention will be better understood by reading the following detailed description of the preferred embodiments of the invention when considered in conjunction with the accompanying drawings, in which:

FIG. 5A is a plan view of the guide mark;

FIG. 5B is a cross-sectional view taken along line Vb-Vb in FIG. 5A;

FIG. 5C is a cross-sectional view taken along line Vc-Vc in FIG. 5A;

FIG. 6A is a perspective view of a guide mark as a modified embodiment;

FIG. 6B is a cross-sectional view of the guide mark in FIG. 6A;

FIG. 6C is a perspective view of a guide mark as another modified embodiment;

FIG. 6D is a cross-sectional view of the guide mark in FIG. 6C;

FIG. 7A is a plan view of second guide marks of guide marks as another modified embodiment;

FIG. 7B is a side view of first guide marks of the guide marks in FIG. 7A;

FIG. 7C is a perspective view of the guide marks in FIG. 7A;

FIGS. 8A and 8B are plan views of second guide marks of guide marks as another modified embodiment;

DETAILED DESCRIPTION OF THE PREFERRED EMBODIMENTS

Figure 1:
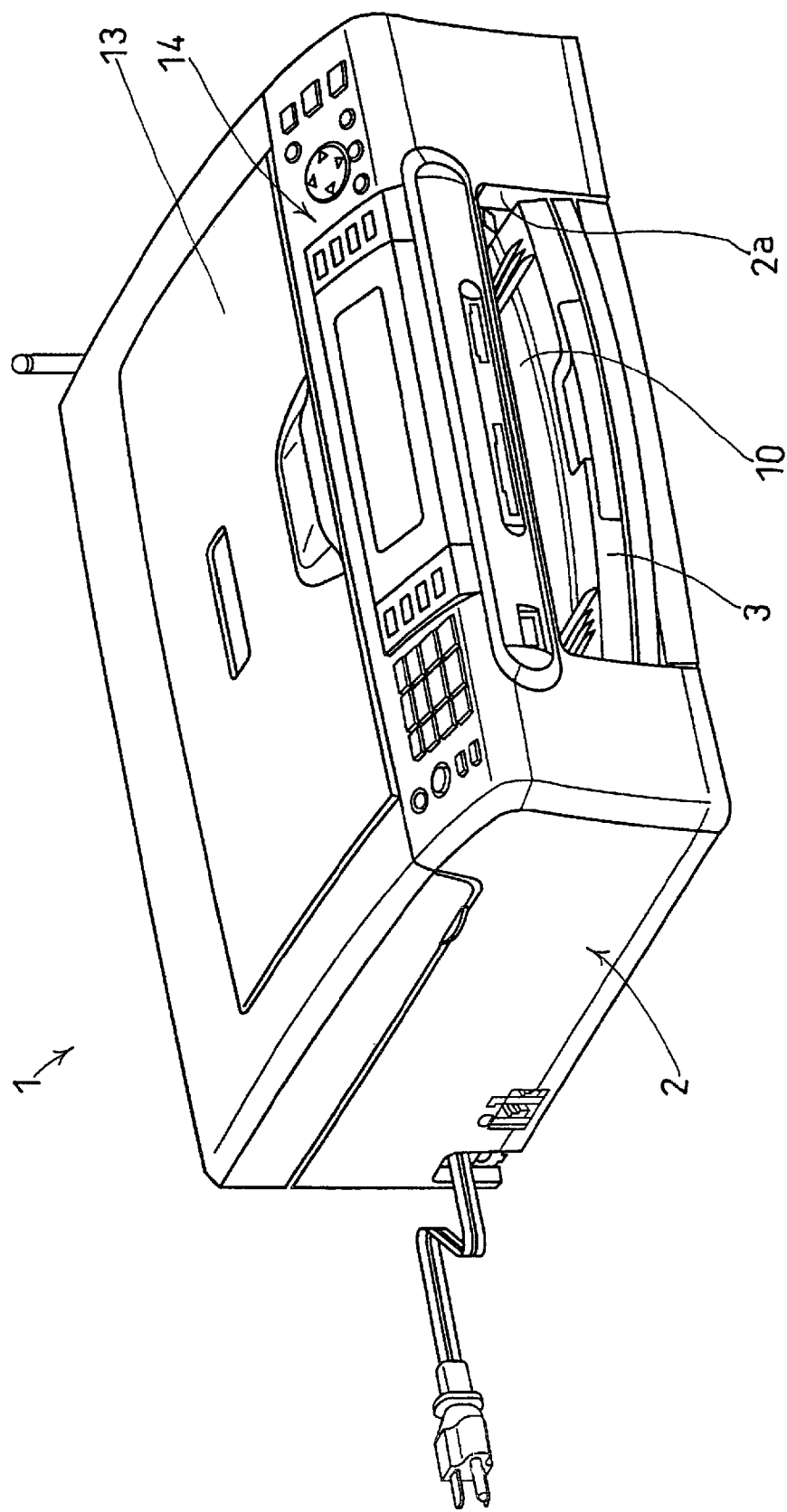
FIG. 1 is a perspective view of a multi-function device (MFD) to which the present invention is applied.
Figure 2:
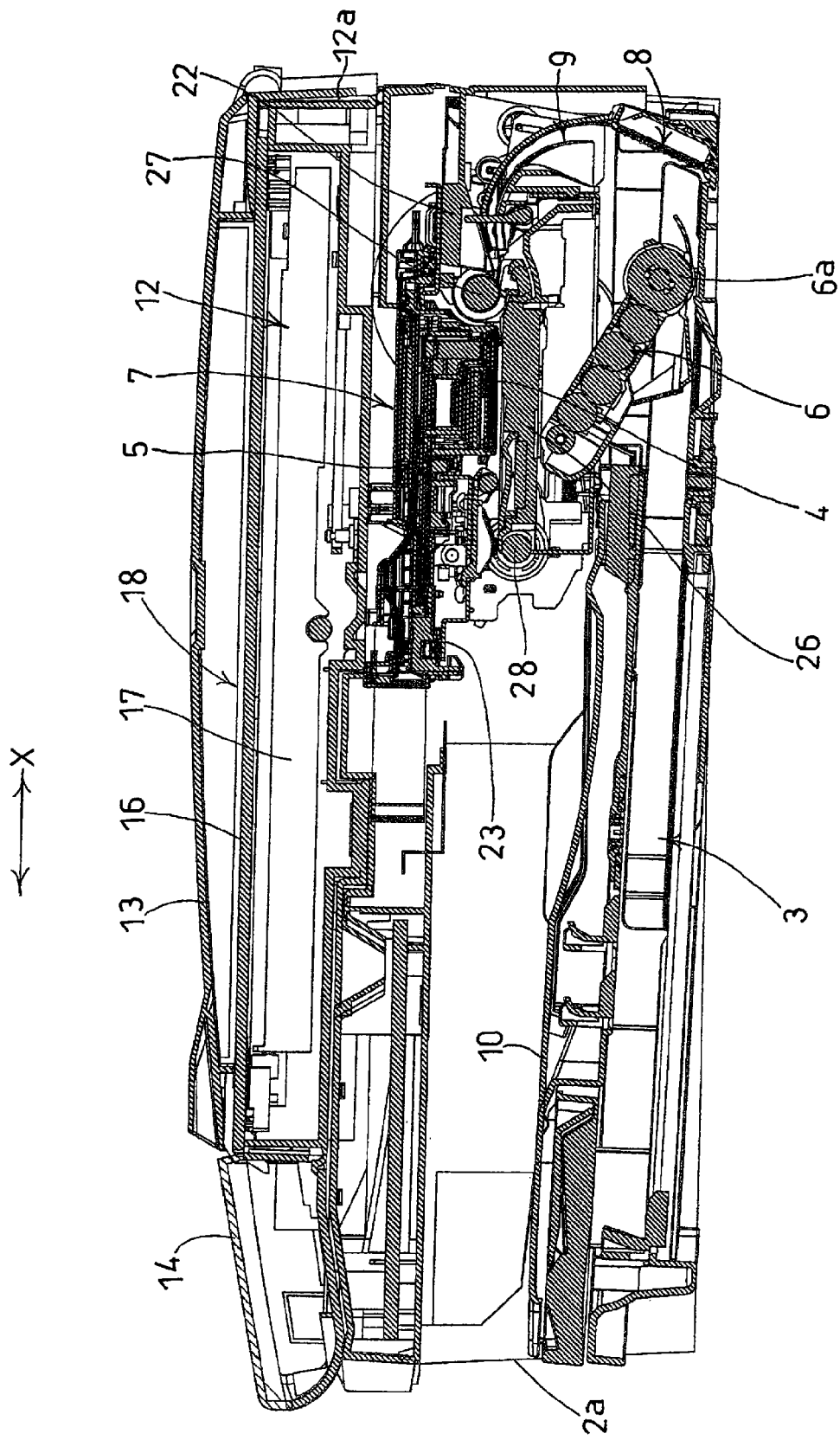
FIG. 2 is a cross-sectional view of the MFD.

Hereinafter, there will be described preferred embodiments of the present invention with reference to the drawings. FIGS. 1 and 2 show a multi-function device (MFD) 1 which has a printer function, a copier function, a scanner function, and a facsimile machine function. The MFD 1 includes an image reading apparatus (a scanner portion 12) as a first embodiment to which the present invention is applied.

As shown in FIG. 2, in an upper portion of a housing 2 of the MFD 1 that is formed of a synthetic resin, the scanner portion 12 is provided to read an original image from an original sheet G in the copier function and in the facsimile machine function. The scanner portion 12 is provided in a casing 12a of the MFD 1 and the scanner portion 12 performs the scanner function to read the original image from the original sheet G and make image data including photo data and document data.

In the facsimile machine function performed by the MFD 1, the image data made in the scanner portion 12 can be transmitted through a telephone network. Also, the MFD 1 performs the copier function to record an image (such as a photograph or a document) on a recording sheet as a recording medium based on the image data made in the scanner portion 12. Further, the MFD 1 can transmit the image data made in the scanner portion 12 to an external data-processor device such as a computer which is connected to the MFD 1 via a cable.

As shown in FIG. 1, a recording portion 7 is provided in a lower portion of the housing 2. On a front side (left-hand side in FIG. 2) of the lower portion of the housing 2, there are provided a front opening 2a and a sheet-supply cassette device 3 which is insertable into or retractable from the front opening 2a relative to an accommodating space in a bottom portion of the housing 2 which can accommodate the sheet-supply cassette device 3. The sheet-supply cassette device 3 is insertable into or retractable from the front opening 2a in a substantially horizontal direction. In the following description of each of the components, such as the housing 2, a portion, an end, or a side of the each component which is located nearer to the front opening 2a will be referred to as a front portion, a front end, or a front side of the each component, and a portion, an end, or a side of the each component which is located opposite to the front opening 2a will be referred to as a rear portion, a rear end, or a rear side of the each component.

In a top portion of the housing 2, there is provided an operation portion 14 that is located in front of the scanner portion 12 and includes an operation panel having various sorts of operation keys and a liquid-crystal display. Under the operation portion 14 and the scanner portion 12, within respective projected areas thereof, the recording portion 7 and a sheet discharging portion 10 are provided.

Figure 3:
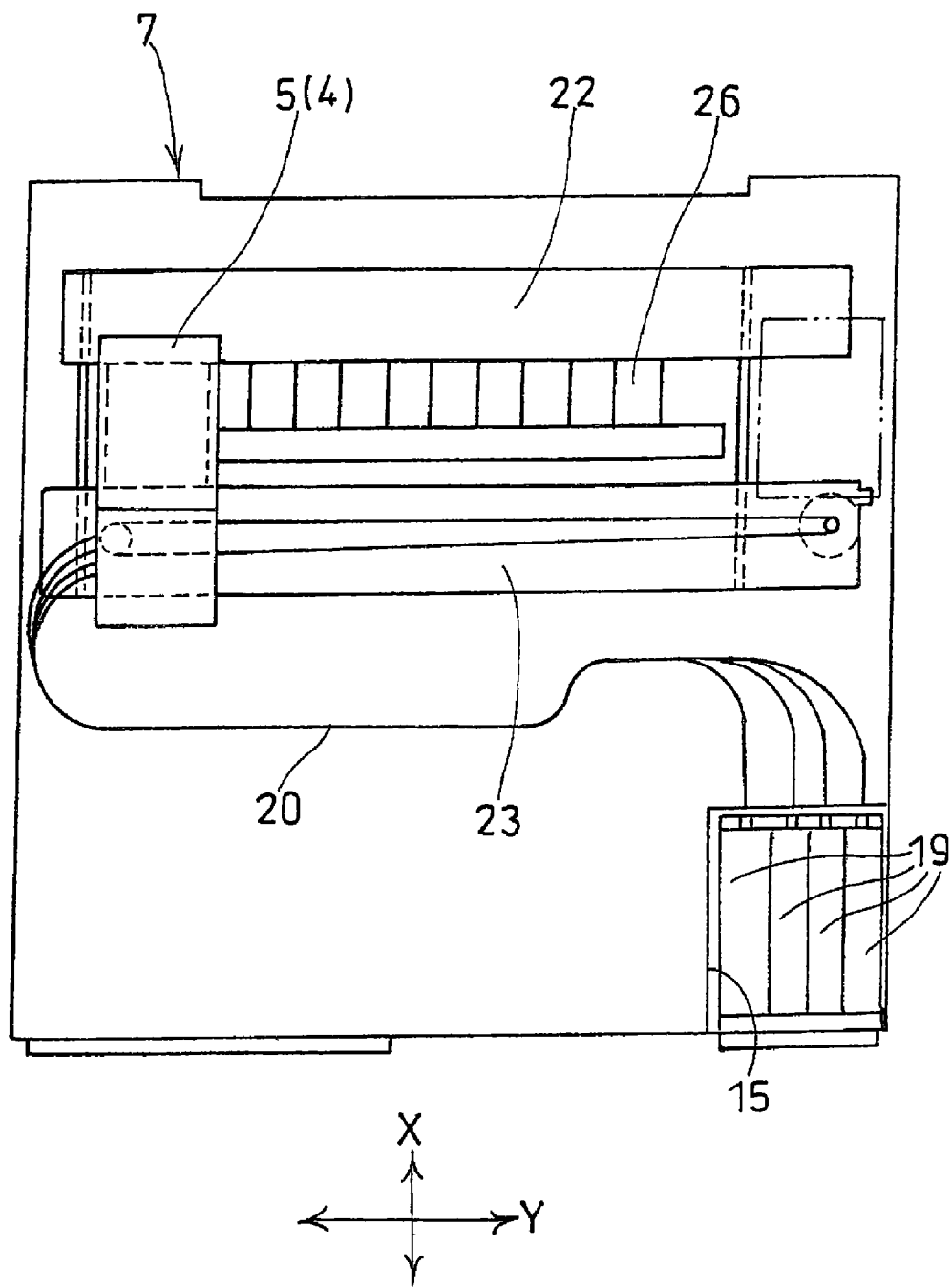
FIG. 3 is a plan view schematically showing a structure around a recording portion of the MFD.

As shown in FIG. 3, an ink reservoir portion 15 is provided on one side of the sheet discharging portion 10 (on a front right-hand side in FIG. 1) in the housing 2. In the present embodiment, the ink reservoir portion 15 accommodates four ink cartridges 19 storing black (B), cyan (C), magenta (M), and yellow (Y) inks, respectively. Inks accommodated in the four ink cartridges 19 are independently supplied to a recording head 4 via respective four ink supply tubes 20 having a flexibility.

The scanner portion 12 includes an original-sheet support table 18 having a support glass plate 16 as a transparent flat plate on which the original sheet G is supported. An image scanner 17 (e.g., a contact image sensor (CIS)) is provided below the glass plate 16. The image scanner 17 is reciprocateable in a direction perpendicular to a sheet plane of FIG. 2 (a main scanning direction of a carriage 5 or a Y-axis direction) to read the original image borne by the original sheet G. The image scanner 17 is moved in the Y-axis direction to read the original image from the original sheet G which is placed on the support glass plate 16 with the recorded surface of the original sheet G facing downward, so that the image data is made in the scanner portion 12. A cover member 30 which covers the support glass plate 16 is pivotable upward and downward about a rear end portion (a right-hand end portion in FIG. 2) so as to be opened and closed relative to the casing 12a.

As shown in FIGS. 2 and 3, the recording portion 7 includes the recording head 4 which is mounted on the carriage 5 and a platen 26 which is opposed to the recording head 4. The carriage 5 is slidably supported by two elongate plate-like first and second guide members 22, 23 extending in the main scanning direction of the carriage 5 or in the Y-axis direction such that the carriage 5 is reciprocateable in the Y-axis direction.

Below the platen 26, there is provided a sheet-supply device 6 that has an arm-like structure. The sheet-supply device 6 includes a sheet-supply roller 6a provided in a leading end of the sheet-supply device 6. The sheet-supply roller 6a is constructed so as to contact an upper surface of an uppermost one of the recording sheets accommodated in the sheet-supply cassette device 3. The sheet-supply cassette device 3 has, in a rear end portion thereof (i.e., a right-hand end portion in FIG. 2), an inclined sheet-separate plate 8 which separates each one recording sheet from the other recording sheets. The sheet-supply roller 6a and the inclined sheet-separate plate 8 cooperate with each other to separate each of the recording sheets stacked on each other in the sheet-supply cassette device 3, and supply the thus separated recording sheet to a U-turn path (i.e., a sheet-convey or sheet-feed path) 9 which first extends upward, then curves toward the front side (i.e., left side in FIG. 2) of the MFD 1.

Two register rollers 27 are provided on an upstream side of the platen 26 in a sheet-feed direction (i.e., in an X-axis direction perpendicular to the Y-axis direction). The two register rollers 27 cooperate with each other to pinch and feed (convey) the recording sheet to a space between the platen 26 and a lower surface (a nozzle-opening surface) of the recording head 4. On a downstream side of the platen 26, there are provided two discharge rollers 28 that cooperate with each other to feed the recorded sheet to the sheet discharging portion 10. After the recording portion 7 records the image on the each recording sheet, the each sheet is discharged onto the sheet discharging portion 10.

Figure 4A:
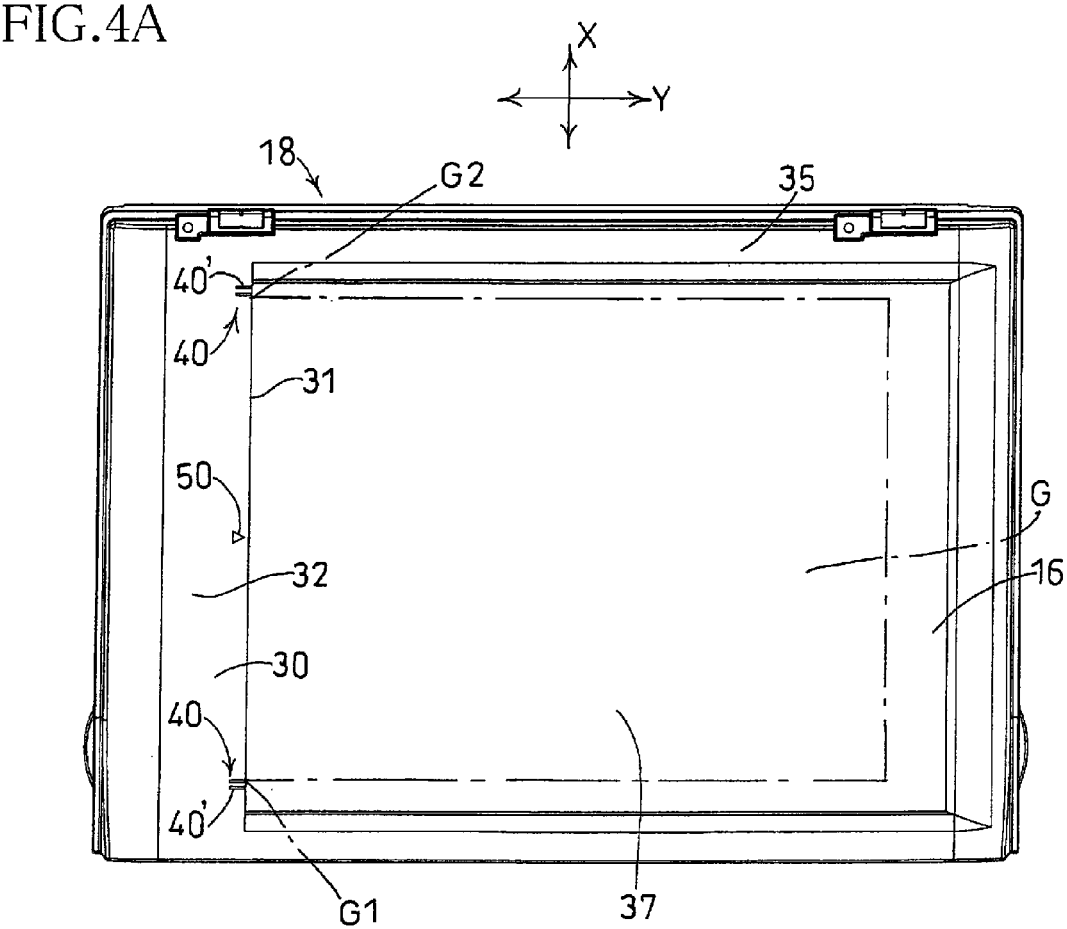
FIG. 4A is a plan view of an original-sheet support table of the MFD according to a first embodiment.

As shown in FIG. 4A, the original-sheet support table 18 further includes a frame member 35 which covers the periphery of the support glass plate 16 having a quadrangular shape in its plan view. The frame member 35 consists of a plurality of members such that each of an outer periphery and an inner periphery of the frame member 35 has a quadrangular shape in its plan view. As shown in FIG. 5C, a periphery of the support glass plate 16 is inserted into a groove or recessed portion 36 formed in a middle portion of the frame member 35 in a direction of thickness thereof.

The frame member 35 and the support glass plate 16 are arranged such that respective short sides of the frame member 35 and the support glass plate 16 extend in the X-axis direction. At least one of the short sides of the frame member 35 constitutes a guide member 30 for guiding a user in positioning of the original sheet G in the original-sheet support table 18. An area of an upper surface of the support glass plate 16 which is located inside of the frame member 35 constitutes an original-sheet support surface 37.

As described before, the periphery of the support glass plate 16 is inserted into the recessed portion 36 formed in the middle portion of the frame member 35 in the direction of thickness thereof, so that the guide member 30 includes a cover portion 34 having flat plate structure which is mounted on the periphery of the upper surface of the support glass plate 16 and which covers the periphery thereof. The cover portion 34 includes: (1) an upper surface 32 which extends substantially in parallel with the original-sheet support surface 37 and can be recognized from an outside of the MFD 1; (2) a lower surface 33 which is opposed to and mounted on the periphery of the upper surface of the support glass plate 16; and (3) a contact surface 31 which is a side surface adjacent to the upper surface 32 and the lower surface 33 and extends in a direction perpendicular to the upper surface 32 and the lower surface 33 and which is contactable with one side of the original sheet G placed on the original-sheet support surface 37. The guide member 30 and the contact surface 31 extend in the X-axis direction or a widthwise direction of the original-sheet support surface 37. In the present embodiment, the contact surface 31 stands up from the original-sheet support surface 37. The cover portion 34 has an inclined upper surface which is inclined such that a thickness of the cover portion 34 decreases toward a portion thereof adjacent to the original-sheet support surface 37 in the Y-axis direction. Though the contact surface 31 may stand up perpendicularly from the original-sheet support surface 37, the inclined upper surface in the present embodiment has an advantage that a user can easily recognize the contact surface 31.

In the guide member 30, guide marks 40 are provided or formed for indicating a position in the widthwise direction at which the original sheet G should be positioned when the original sheet G is held in contact with the contact surface 31. The original sheet G is positioned on the original-sheet support surface 37 in the Y-axis direction when the one side of the original sheet G is held in contact with the contact surface 31 and is positioned on the original-sheet support surface 37 in the X-axis direction when opposite ends of the one side of the original sheet G which are distant from each other in the X-axis direction are aligned with the guide marks 40.

In the present embodiment, as shown in FIG. 4A, the original sheet G is positioned on the original-sheet support surface 37 in the X-axis direction such that a centerline of the original sheet G in the X-axis direction or in the widthwise direction is generally aligned with a centerline of the original-sheet support surface 37 in the X-axis direction. In the upper surface 32 of the cover portion 34, a center mark 50 is provided for indicating the centerline of the original-sheet support surface 37 in the X-axis direction. The center mark 50 has a triangular shape, one of three sharp-angled ends thereof being aligned with the centerline of the original-sheet support surface 37 in the X-axis direction. In the guide member 30, a pair of the guide marks 40 are distant from each other in the X-axis direction or in the widthwise direction, so that the two guide marks 40 respectively indicate positions in the X-axis direction of long sides G1, G2 of the original sheet G extending in the Y-axis direction perpendicular to the X-axis direction. For example, corresponding to the original sheet G of A4 Size, the two guide marks 40 are located in the guide member 30 distant from each other in the X-axis direction by a distance corresponding to a length of a short side of the A4-Size original sheet G.

Also, a size of the original sheet G which should be positioned on the original-sheet support surface 37, e.g., "A4", may be indicated in the vicinity of the guide marks 40 provided or formed on the upper surface 32 of the guide member 30. Further, a plurality (a plural pair) of the guide marks 40 may be provided in the guide member 30 corresponding to different sizes of the original sheet G such as A4, A5, B4, Postcard, and Letter Size.

In a case in which the original sheet G is positioned on the original-sheet support surface 37 at one of four corners of the frame member 35, two frame portions of the frame member 35, which define the one corner of the frame member 35 and intersect each other perpendicularly, constitute the guide members 30 and have an L-shaped contact surface which is contactable with adjacent two sides of the original sheet G. Further, one long-side frame portion of the frame member 35 may function as the guide member 30.

In the present embodiment, the guide marks 40 are provided at two positions in the guide member 30 distant from each other in the X-axis direction and indicate positions where the original sheet G of A4 Size should be positioned in the X-axis direction. In the vicinity of the guide marks 40, guide marks 40' are provided or formed in respective portions of the guide member 30 adjacent to the guide marks 40 and more distant from the center mark 50 in the X-axis direction. Each guide mark 40' has the same structure as the guide mark 40 and indicates a position of the original sheet G of Letter Size in the X-axis direction.

Figure 4B:
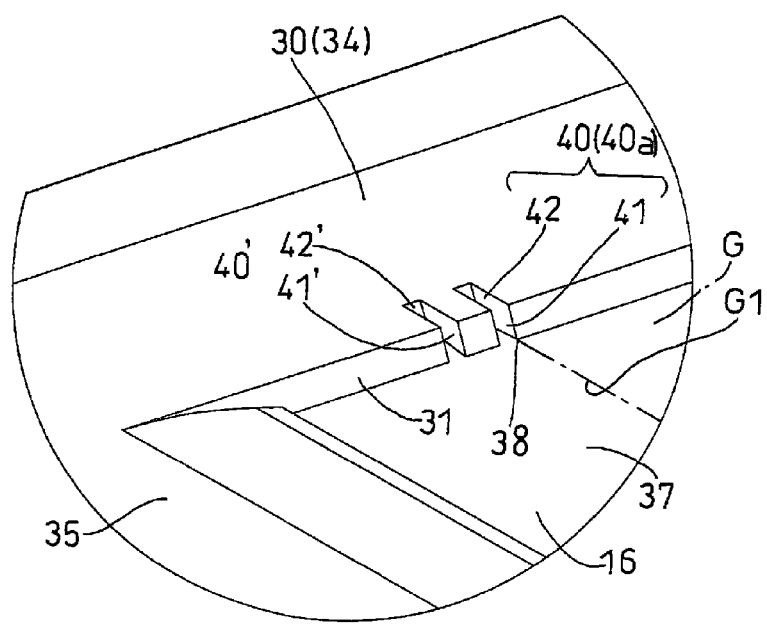
FIG. 4B is an enlarged, perspective view of a guide mark of the original-sheet support table as the first embodiment.

The guide marks 40 (40') are provided at least in the contact surface 31 of the guide member 30 and boundaries (outlines) of the guide marks 40 are exposed to or appear in the contact surface 31. As shown in FIGS. 4A and 4B, when the original sheet G is positioned on the original-sheet support surface 37, the opposite-ends of the one side of the original sheet G are aligned with position points 38 which consist of specific points of the boundary of the guide marks 40 nearer to the center mark 50 and nearer to the original-sheet support surface 37.

As shown in FIGS. 4 and 5, each guide mark 40 in the first embodiment (referred to as each guide mark 40a) includes a common recess (groove) which opens to the contact surface 31 and the upper surface 32 of the cover portion 34. A guide mark which is provided in the contact surface 31 constitutes a first guide mark 41 and a guide mark which is provided in the upper surface 32 constitutes a second guide mark 42. The first guide mark 41 and the second guide mark 42 connect to each other at a line of intersection at which the contact surface 31 and the upper surface 32 intersect. Similar to the guide mark 40, each guide mark 40' includes a first guide mark 41' and a second guide mark 42' connecting to each other. Since each guide mark 40' has the same structure as the guide mark 40, a detailed explanation thereof is omitted.

More specifically, each guide mark 40*a* has the quadrangular common recess formed in the upper surface 32 which has a width W and a length L and extends from the contact surface 31 in a direction perpendicular to the widthwise direction (or in the Y-axis direction) and which also has a depth (thickness) T and penetrates through the cover portion 34 in a vertical direction. In other words, one quadrangular opening of the common recess to the contact surface 31 with the height T and the width W constitutes the first guide mark 41 and the other quadrangular-shape opening to the upper surface 32 with the length L and the width W constitutes the second guide mark 42.

The guide mark 40*a* includes the common recess which penetrates through the cover portion 34 in the vertical direction or in a direction of thickness of the cover portion 34 and opens to the contact surface 31 and the upper surface 32, so that a portion of the support glass plate 16 (a flat surface which extends from the original-sheet support surface 37 toward the cover portion 34 in the Y-axis direction and is level with the original-sheet support surface 37) is exposed to or appears in an inner space defined by the guide mark 40*a* and the position point 38 can be recognized to be located generally at the same height position of the original-sheet support surface 37.

In the present embodiment, as shown in FIG. 4A, the original sheet G is positioned on the original-sheet support surface 37 in a state in which the one side of the original sheet G is held in contact with the contact surface 31 and the long sides G1, G2 of the original sheet G perpendicular to the one side thereof (or the opposite ends of the one side of the original sheet G) are respectively aligned with respective two edges of the two guide marks 40*a* which are distant from each other in the X-axis direction. As shown in FIGS. 4B and 5A, in one of the two guide marks 40*a* located nearer to the user or in a lower side of the guide member 30 in FIG. 4A, the long side G1 of the original sheet G is aligned with the position point 38 of the guide mark 40*a* closer to the center point 50 as one of the respective two edges of the guide mark 40*a*.

According to the present embodiment, since the first guide mark 41 is provided in the contact surface 31 as at least a portion of the guide mark 40*a*, the position point 38 of the guide mark 40*a* can be located at a height position closer to a height position of the original sheet G placed on the original-sheet support surface 37. Thus, even though the user looks at the guide mark 40*a* from an inclined angle relative to the original-sheet support surface 37, not right above the MFD 1 when the original sheet G is aligned with the position point 38, the user can recognize the guide mark 40*a* in a state in which the position point 38 is generally level with the original-sheet support surface 37 (or the original sheet G on the original-sheet support surface 37), leading to accurate positioning of the original sheet G on the original-sheet support surface 37. Further, in addition to the first guide mark 41, the second guide mark 42 is provided or formed in the upper surface 32 of the guide member 30, so that the user can find and recognize the guide mark 40*a* more easily.

Furthermore, in the present embodiment, the two guide marks 40 (40*a*) are distant from each other in the guide member 30 in the X-axis direction and indicate the positions in the X-axis direction at which the original sheet G of A4 Size should be positioned. The two guide marks 40' are provided on respective portions of the guide member 30 adjacent to the guide marks 40 and more distant from the center mark 50 in the X-axis direction, each guide mark 40' indicating a position of the original sheet G of Letter Size in the X-axis direction. Though the guide mark 40' is provided in the vicinity of the guide mark 40, the guide mark 40 includes the first guide mark 41 and the second guide mark 42 connecting to each other, so that the user is prevented from confusing the guide mark 40 with the guide mark 40'. More precisely, in the guide mark 40, the first guide mark 41 and the second guide mark 42 include the common recess which opens to the contact surface 31 and the upper surface 32 and it is apparent that the first guide mark 41 corresponds to the second guide mark 42, indicating a same position in the X-axis direction at which the original sheet G of A4 Size is positioned. As in the guide mark 40, in the guide mark 40', it is apparent that the first guide mark 41' and the second guide mark 42' connect to each other and the first guide mark 41' corresponds to the second guide mark 42'. Therefore, the user can certainly be prevented from confusing the guide mark 40 with the guide mark 40'.

In the present embodiment, the first guide mark 41 and the second guide mark 42 include the common recess which opens to the contact surface 31 and the upper surface 32. Therefore, the first guide mark 41 and the second guide mark 42 can enjoy a high degree of durability, compared to a case in which a guide mark is printed on the guide member 30. That is, in the case in which the guide mark is printed on the guide member 30, the printed guide mark is getting fainted when the original sheet G repeatedly contacts the guide mark. However, in the present embodiment, the first guide mark 41 and the second guide mark 42 are prevented from being fainted and kept clear for the user. Also, the common recess can be easily manufactured.

The guide mark 40 can be modified in various ways instead of the guide mark 40*a* shown in FIGS. 4 and 5. The modified embodiments will be described with reference to FIGS. 6 through 8.

As shown in FIGS. 6A and 6B, the guide mark 40*b* includes a common groove which is formed in the upper surface 32 and which extends from the contact surface 31 in the direction perpendicular to the widthwise direction. The common groove has a stepwise structure and one portion of the common groove adjacent to the contact surface 31 penetrates through the cover portion 34 in the vertical direction and the other portion of the common groove most distant from the contact surface 31 in the direction perpendicular to the widthwise direction has a depth T1 smaller than a depth T of the one portion thereof (T1<T). That is, one quadrangular opening of the common groove with a depth (height) T and a width W to the contact surface 31 constitutes the first guide mark 41 and the other quadrangular opening of the common groove with a length L and the width W to the upper surface 32 constitutes the second guide mark 42.

As shown in FIGS. 6C and 6D, the guide mark 40*c* includes a common groove whose bottom surface consists of an inclined surface such that a depth of the bottom surface of the common groove gradually increases toward one portion of the common groove adjacent to the contact surface 31 from the other portion of the common groove most distant from the contact surface 31 and the bottom surface adjacent to the contact surface 31 has a depth T. Therefore, one quadrangular opening of the common groove with a depth (height) T and a width W to the contact surface 31 constitutes the first guide mark 41 and the other quadrangular opening of the common groove with a length L and the width W to the upper surface 32 constitutes the second guide mark 42. In the guide marks 40*b* and 40*c*, the other portion of the common groove most distant from the contact surface 31 in the direction perpendicular to the widthwise direction has the depth smaller than the depth T of the one portion thereof, so that the cover portion 34 has a thin portion corresponding to the other portion of the common groove whose height is smaller than the height T of the one portion of the cover portion 34. Thus, the user can easily recognize the guide marks 40b and 40c and also portions of the guide member 30 in which the guide marks 40b and 40c are provided or formed can enjoy a high degree of durability.

For the sake of simplicity, FIGS. 7A through 7C show a state in which seven arrangements of guide marks 40d, 40e, 40f, 40g, 40h, 40i, 40j are provided in one guide member 30.

For example, the guide mark 40d includes a V-shaped groove which is formed in the upper surface 32 and which extends from the contact surface 31 in the direction perpendicular to the widthwise direction. The second guide mark 42 of the guide mark 40d includes a quadrangular opening of the V-shaped groove which opens to the upper surface 32. A bottom surface of the V-shaped groove is inclined such that a width of the V-shaped groove decreases toward the bottom surface thereof most distant from the upper surface 32 in the vertical direction. Therefore, the first guide mark 41 of the guide mark 40d includes a V-shaped opening of the V-shaped groove which opens to the contact surface 31. A lowermost sharp end of the V-shaped opening constitutes the position point 38 for positioning one end of the one side of the original sheet G and the position point 38 is located at a height position higher than that of the original-sheet support surface 37 by a dimension Δ T2. In other words, the position point 38 is substantially held in contact with the original-sheet support surface 37.

The guide mark 40e includes a common groove which is formed in the upper surface 32 and which extends from the contact surface 31 in the direction perpendicular to the widthwise direction. The second guide mark 42 of the guide mark 40e includes a quadrangular opening of the common groove which opens to the upper surface 32. The guide mark 40e has a stepwise structure in which a width of the common groove decreases toward a bottom surface thereof in the vertical direction. The first guide mark 41 of the guide mark 40e includes an opening of the common groove which opens to the contact surface 31 and a depth of a center portion of the opening of the first guide mark 41 in the widthwise direction is larger than that of opposite end portions of the opening of the first guide mark 41 distant from each other in the widthwise direction. Also, in the guide mark 40e, one portion of the common groove adjacent to the contact surface 31 penetrates through the cover portion 34 in the vertical direction while the other portion of the common groove distant from the contact surface 31 in the direction perpendicular to the widthwise direction does not penetrate through the cover portion 34 in the vertical direction. That is, the one portion of the common groove has a depth larger than that of the other portion of the common groove.

The second guide mark 42 of the guide mark 40f includes a projection having a quadrangular cross section which extends from the contact surface 31 in the direction perpendicular to the widthwise direction and which projects from the upper surface 32 by a height Δ T3. Also, the first guide mark 41 includes a projection having a triangular cross section which projects from the contact surface 31 by a height Δ L1. A lowermost sharp end of the triangular shape is held in contact with the original-sheet support surface 37.

In the guide mark 40g, the second guide mark 42 includes a projection having a quadrangular cross section which extends from a portion of the cover portion 34 distant from the contact surface 31 by a length Δ L1 in the direction perpendicular to the widthwise direction and which projects from the upper surface 32 by a height Δ T3. The first guide mark 41 includes a triangular opening which opens to the contact surface 31 and the position point 38 constituted by a lowermost sharp end of the triangular opening is located at a height position higher than the original-sheet support surface 37 by a height Δ T2.

In the guide mark 40h, the second guide mark 42 includes a quadrangular recess which extends from a portion of the cover portion 34 distant from the contact surface 31 by a length Δ L2 in the direction perpendicular to the widthwise direction and which opens to the upper surface 32 and has a depth smaller than the height T of the cover portion 34. The first guide mark 41 includes a projection having a quadrangular cross section which projects from the contact surface by a length Δ L1 and whose lower side is held in contact with the original-sheet support surface 37.

The guide mark 40i includes straight lines constituting the first guide mark 41 and the second guide mark 42 which connect to each other and which are drawn on the guide member 30 (the cover portion 34). A lowermost end of the straight line constituting the first guide mark 41 is held in contact with the original-sheet support surface 37. The first guide mark 41 and the second guide mark 42 are drawn in a color distinguishable from a color of a portion adjacent to the guide mark 40i of the guide member 30.

Like the guide mark 40a, the guide mark 40j includes a common recess which is formed in the upper surface 32 and which extends from the contact surface 31 in the direction perpendicular to the widthwise direction. The first and the second guide marks 41, 42 of the guide mark 40j include quadrangular openings of the common recess which open to contact surface 31 and the upper surface 32, respectively. The common recess is filled with a guide-mark material 43 which is distinguishable from a recess-defining material forming a portion of the guide member 30 defining the common recess. A portion of a boundary between the guide-mark material 43 and the recess-defining material which is provided in the contact surface 31 and nearer to the original-sheet support surface 37 functions as the position point 38. As shown in FIGS. 4A and 4B, when the original sheet G is positioned on the original-sheet support surface 37, the opposite ends of the one side of the original sheet G are aligned with position points. The guide-mark material 43 may be a colored material in a different color distinguishable from a color of the recess-defining material. However, where the recess-defining material consists of an opaque material and the guide-mark material 43 consists of a transparent material, the user can see the original-sheet support surface 37 through the transparent guide-mark material 43 (the guide mark 40j) and easily recognize the guide mark 40j and the original sheet G placed on the original-sheet support surface 37, similar to the guide mark 40a, leading to accurate positioning of the original sheet G on the original-sheet support surface 37. Also, according to the guide mark 40j arranged as described above, dusts are prevented from accumulating in a space inside the common recess.

The second guide mark 42 is not limited to the quadrangular opening or the straight line mentioned above. For example, as shown in FIG. 8A, the guide mark 40 may have a common recess which is formed in the upper surface 32 and extends from the contact surface 31 in the direction perpendicular to the widthwise direction and whose width gradually decreases toward the other portion of the common recess most distant from the contact surface 31 in the direction perpendicular to the widthwise direction. As shown in FIG. 8B, the guide mark 40 may have a common recess which is formed in the upper surface 32 and extends from the contact surface 31 in the direction perpendicular to the widthwise direction and whose width gradually increases toward the other portion of the common recess most distant from the contact surface 31 in the direction perpendicular to the widthwise direction. In addition to the illustrated embodiments mentioned above, the guide mark 40 may be embodied with various changes, e.g., by a combination of the illustrated embodiments.

In the present invention, the first guide mark 41 includes an opening of a recess whose boundary (outline) is formed in the contact surface 31 and it is not necessary that the recess should penetrate through the cover portion 34 in a vertical direction. As mentioned above, the first guide mark 41 may include a recess or a projection formed in the contact surface 31 such that a boundary of the recess or the projection is formed in the contact surface 31. In a case in which the first guide mark 41 includes a projection, a length of the projection in the direction perpendicular to the widthwise direction and a height position of the position point 38 need to be considered in order not to interfere with a positioning of the original sheet G. The first guide mark 41 including a projection provided in the contact surface 31 can be manufactured more easily by a mold to form the guide member 30.

Figure 9A:
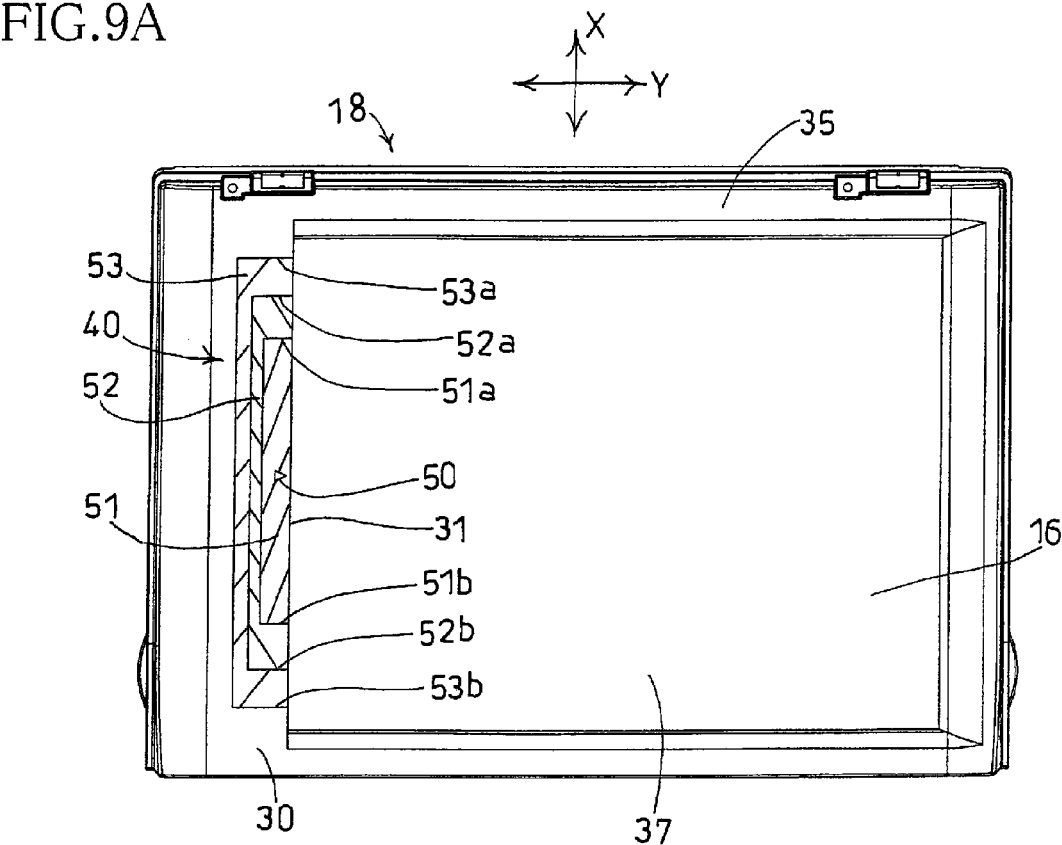
FIG. 9A is a plan view of an original-sheet support table as a second embodiment of the present invention.
Figure 9B:
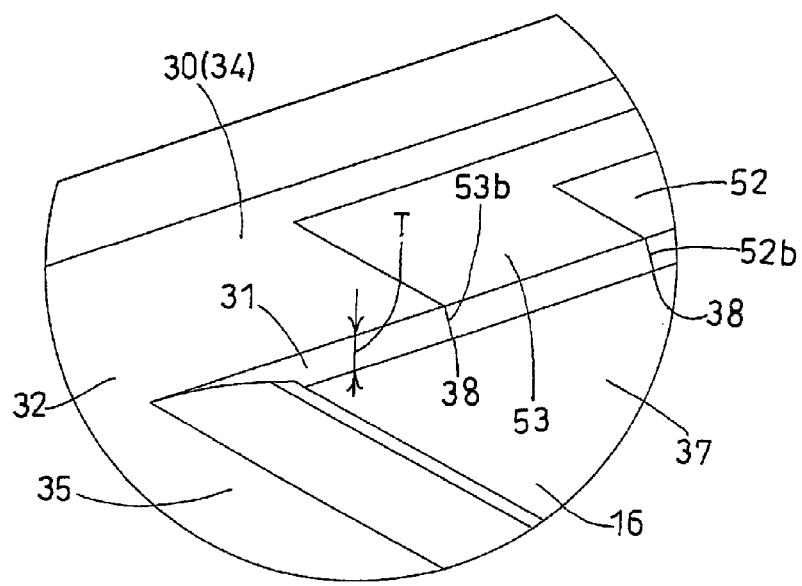
FIG. 9B is an enlarged, perspective view of a guide mark of the original-sheet support table as the second embodiment.
Figure 10A:
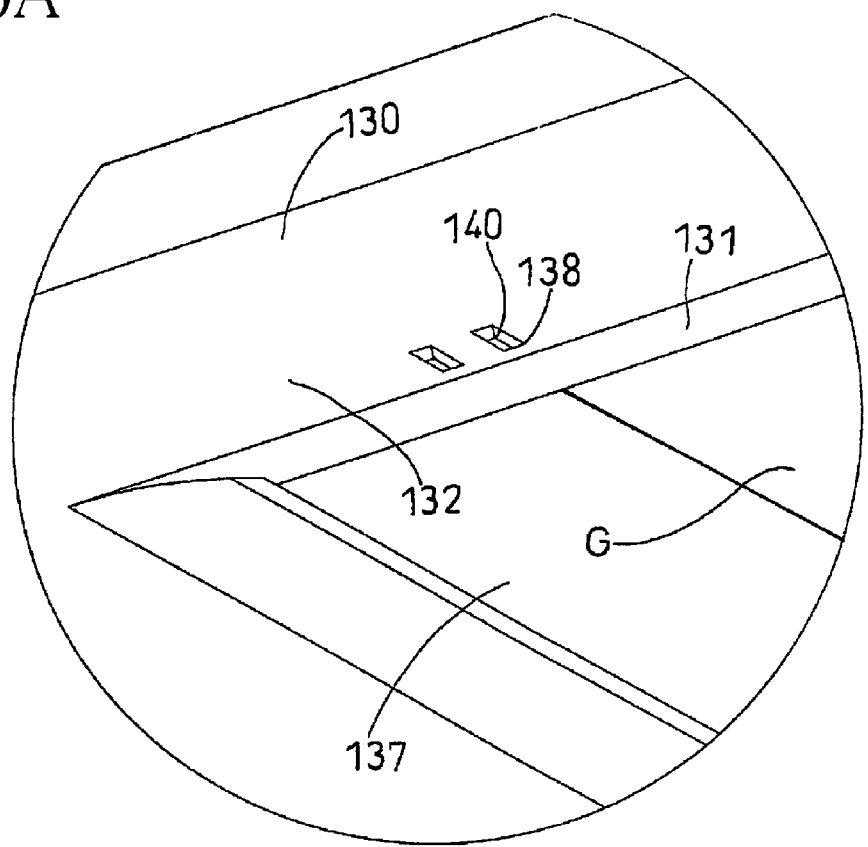
FIG. 10A is a plan view of a conventional original-sheet support table.
Figure 10B:
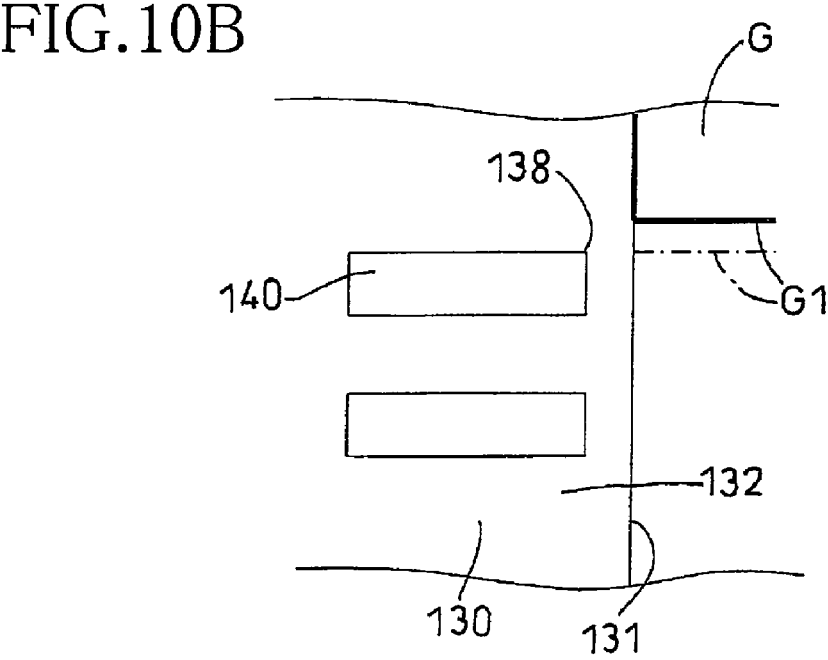
FIG. 10B is an enlarged, perspective view of a guide mark of the conventional original-sheet support table.

Next, there will be described a guide mark as a second embodiment of the present invention with reference to FIG. 9. In this embodiment, the same reference numerals as used in the first embodiment are used to identify the corresponding components, and a detailed explanation thereof is not provided. The present embodiment is a modified embodiment of the guide mark 40j shown in FIG. 7.

In the guide member 30, there is formed a recess and the recess is filled with a first member 51, a second member 52 and a third member 53. The first, second, third members 51, 52, 53 are formed of guide-mark materials having colors distinguishable from that of a recess-defining material of the guide member 30. The respective colors of the first, the second and the third members 51, 52, 53 are different from each other. In FIG. 9A, the first, second, third members 51, 52, 53 are distinguished from each other by different hatchings. The first member 51 has a quadrangular shape in its plan view extending in the X-axis direction and having the same height T as that of the cover portion 34 and is located on a center portion of the guide member 30 in the widthwise direction (the X-axis direction). One long-side surface of the first member 51 is opposed to the original-sheet support surface 37.

The second member 52 has a box-like structure which covers three side surfaces of the first member 51 except the one long-side surface opposed to the original-sheet support surface 37 and which has the same height T as that of the cover portion 34. Side surfaces of the second member 52 opposed to the original-sheet support surface 37 are distant from each other in the X-axis direction relative to the long-side surface of the first member 51 and are level with the long-side surface thereof.

The third member 53 has a box-like structure which covers three side surfaces of the second member 52 except the side surfaces opposed to the original-sheet support surface 37 and has the same height T as that of the cover portion 34. Side surfaces of the third member 53 opposed to the original-sheet support surface 37 are distant from each other in the X-axis direction relative to the side surfaces of the second member 52 and are level with the side surfaces thereof.

The long-side surface and the side surfaces of the first, second, third members 51, 52, 53 opposed to the original-sheet support surface 37 constitute the contact surface 31 together with side surfaces of the base portion of the guide member 30 opposed to the original-sheet support surface 37.

In the present embodiment, for example, a dimension of the first member 51 measured in a lengthwise direction or in the X-axis direction is determined to be same as that of a short side of the original sheet G of B5 Size. A dimension of the second member 52 measured in a lengthwise direction thereof or in the X-axis direction is determined to be the same as that of a short side of an A4 Size sheet. A dimension of the third member 53 measured in a lengthwise direction thereof or in the X-axis direction is determined to be the same as that of a short side of a B4 Size sheet.

Therefore, guide marks 40 for positioning the short side of the B5 Size sheet in the X-axis direction are constituted by boundary lines 51a, 51b defining boundaries between the first member 51 and the second member 52 which extend over the contact surface 31 and the upper surface 32 in the Y-axis direction. Also, guide marks 40 for positioning the short side of the A4 Size sheet in the X-axis direction are constituted by boundary lines 52a, 52b defining boundaries between the second member 52 and the third member 53 which extend over the contact surface 31 and the upper surface 32 in the Y-axis direction. Further, guide marks 40 for positioning the short side of the B4 Size sheet in the X-axis direction are constituted by boundary lines 53a, 53b defining boundaries between the third member 53 and the base portion of the guide member 30 which extend over the contact surface 31 and the upper surface 32 in the Y-axis direction.

As mentioned above, based on the different colors of the first, second, third members 51, 52, 53 and relative positional relationship between the same 51, 52, 53, the user can easily recognize sizes of the sheet corresponding to the first, second, third members 51, 52, 53. Therefore, the present embodiment can enjoy a high efficiency of positioning the original sheet G on the original-sheet support surface 37.

In addition that the boundary lines 51a, 51b, 52a, 52b, 53a, 53b are defined by different-colored materials disposed adjacent to each other, straight lines may be drawn in a different color such as black on the boundary lines 51a, 51b, 52a, 52b, 53a, 53b.

According to the second embodiment, a portion of the guide mark 40 is formed in the contact surface 31, so that a difference of height positions between the guide mark 40 and the original sheet G on the original-sheet support surface 37 can be decreased, leading to a high accuracy of positioning the original sheet G on the original-sheet support surface 37. In the present embodiment, the recess formed in the guide member 30 is filled with the first, second, third members 51, 52, 53, so that the original sheets G with three different sizes can be positioned on the original-sheet support surface 37. The size of the original sheets which can be positioned on the original-sheet support surface 37 is not limited to the three different sizes illustrated above.

The present invention is not limited to be applied to the illustrated embodiments in which the MFD 1 includes the scanner portion 12 of flat-bed type but may be applied to an embodiment in which the MFD 1 includes the scanner portion 12 of a flat-bed type equipped with an ADF (automatic document feeder).

In the illustrated embodiments, the support glass plate 16 is supported by the frame member 35 such that the periphery of the support glass plate 16 is inserted into the recessed portion 36, so that the support glass plate 16 can be exposed to or appear in an inner space of the guide mark 40 in the case in which the guide mark 40 penetrates through the cover portion 34 in the vertical direction. However, the support glass plate 16 may be supported by the frame member 35 in different ways. When at least a portion of the guide mark 40 is formed in the contact surface 31, an accuracy of positioning the original sheet G on the original-sheet support surface 37 is improved. Therefore, it is not necessary that the support glass plate 16 should be exposed to the inner space of the guide mark 40.

It is to be understood that the present invention may be embodied with various changes and improvements that may occur to a person skilled in the art, without departing from the spirit and scope of the invention defined in the appended claims.

What is claimed is:

1. An image reading apparatus comprising an original-sheet support table and reading an image on an original sheet supported by the original-sheet support table,
   wherein the original-sheet support table includes:
   (a) an original-sheet support surface on which the original sheet is supported;
   (b) a contact surface which intersects the original-sheet support surface and is contactable with one side of the original sheet supported by the original-sheet support surface; and
   (c) at least one guide mark which is provided in the contact surface;
   an upper surface which extends from an upper edge of the contact surface in a direction perpendicular to a widthwise direction parallel to the original-sheet support surface and the contact surface; and
   a second guide mark which is provided in the upper surface adjacent to a first guide mark as the guide mark,
   wherein the original sheet is positioned on the original-sheet support surface in a state in which the one side of the original sheet is held in contact with the contact surface of the original-sheet support table and one end of the one side of the original sheet is aligned with the at least one guide mark.

2. The image reading apparatus according to claim 1, wherein the at least one guide mark includes a recess provided in the contact surface of the original-sheet support table.

3. The image reading apparatus according to claim 2, wherein at least a part of the recess of the at least one guide mark is filled with a guide-mark material which is distinguishable from a recess-defining material forming a portion of the original-sheet support table which defines the recess.

4. The image reading apparatus according to claim 3, wherein the recess-defining material consists of an opaque material and the guide-mark material consists of a transparent material.

5. The image reading apparatus according to claim 1, wherein the first guide mark and the second guide mark connect to each other at a line of intersection at which the contact surface and the upper surface intersect.

6. The image reading apparatus according to claim 1, wherein the first guide mark and the second guide mark include at least one recess which opens to the contact surface and the upper surface.

7. The image reading apparatus according to claim 6, wherein the first guide mark and the second guide mark include a common recess which opens to the contact surface and the upper surface.

8. The image reading apparatus according to claim 7, wherein the common recess includes a V-shaped groove which is formed in the upper surface and extends from the contact surface in the direction perpendicular to the widthwise direction,
   wherein the first guide mark includes a V-shaped opening of the V-shaped groove which opens to the contact surface and a lowermost sharp end of the V-shaped opening is substantially held in contact with the original-sheet support surface, and
   wherein the second guide mark includes a quadrangular opening of the V-shaped groove which opens to the upper surface.

9. The image reading apparatus according to claim 7, wherein the common recess includes a common groove which is formed in the upper surface and which extends from the contact surface in the direction perpendicular to the widthwise direction, and
   wherein one portion of the common groove adjacent to the contact surface has a depth larger than that of another portion of the common groove most distant from the contact surface.

10. The image reading apparatus according to claim 6, wherein at least a part of the at least one recess is filled with a guide-mark material which is distinguishable from a recess-defining material forming a portion of the original-sheet support table which defines the recess.

11. The image reading apparatus according to claim 10, wherein the recess-defining material consists of an opaque material and the guide-mark material consists of a transparent material.

12. The image reading apparatus according to claim 1, wherein the original-sheet support surface is constituted by one of opposite surfaces of a transparent flat plate, and
    wherein the contact surface is constituted by a side surface of a guide member which is formed independently of the flat plate.

13. The image reading apparatus according to claim 12, wherein the guide member includes a cover portion which is mounted on a periphery of the one of opposite surfaces of the transparent flat plate and which covers the periphery thereof, and
    wherein a side surface of the cover portion constitutes the contact surface.

14. An image reading apparatus comprising an original-sheet support table and reading an image on an original sheet supported by the original-sheet support table,
    wherein the original-sheet support table includes:
    (a) an original-sheet support surface on which the original sheet is supported;
    (b) a contact surface which intersects the original-sheet support surface and is contactable with one side of the original sheet supported by the original-sheet support surface; and
    (c) at least one guide mark which is provided in the contact surface,
    wherein the original sheet is positioned on the original-sheet support surface in a state in which the one side of the original sheet is held in contact with the contact surface of the original-sheet support table and one end of the one side of the original sheet is aligned with the at least one guide mark,
    wherein the at least one guide mark has a width in a widthwise direction parallel to the original-sheet support surface and the contact surface, and
    wherein the original sheet is positioned on the original-sheet support surface such that the one end of the one side of the original sheet is aligned with one of respective two edges of the at least one guide mark which are distant from each other in the widthwise direction.

15. An image reading apparatus comprising an original-sheet support table and reading an image on an original sheet supported by the original-sheet support table,
    wherein the original-sheet support table includes:
    (a) an original-sheet support surface on which the original sheet is supported;

(b) a contact surface which intersects the original-sheet support surface and is contactable with one side of the original sheet supported by the original-sheet support surface; and (c) at least one guide mark which is provided in the contact surface, wherein the original sheet is positioned on the original-sheet support surface in a state in which the one side of the original sheet is held in contact with the contact surface of the original-sheet support table and one end of the one side of the original sheet is aligned with the at least one guide mark, wherein the original-sheet support surface is constituted by one of opposite surfaces of a transparent flat plate, wherein the contact surface is constituted by a side surface of a guide member which is formed independently of the flat plate, wherein the guide member includes a cover portion which is mounted on a periphery of the one of opposite surfaces of the transparent flat plate and which covers the periphery thereof, wherein a side surface of the cover portion constitutes the contact surface, wherein the cover portion of the guide member has a groove which extends from the side surface of the cover portion constituting the contact surface in a direction perpendicular to the side surface thereof and which penetrates through the cover portion in a vertical direction, wherein one opening of the groove to the contact surface of the cover portion constitutes at least a portion of a first guide mark as the guide mark, and wherein an other opening of the groove to an upper surface of the cover portion constitutes at least a portion of a second guide mark which connects to the first guide mark.

* * * * *